(No Model.)
J. T. HONEYCUTT.
LINEAR SCALE.
No. 346,368. Patented July 27, 1886.
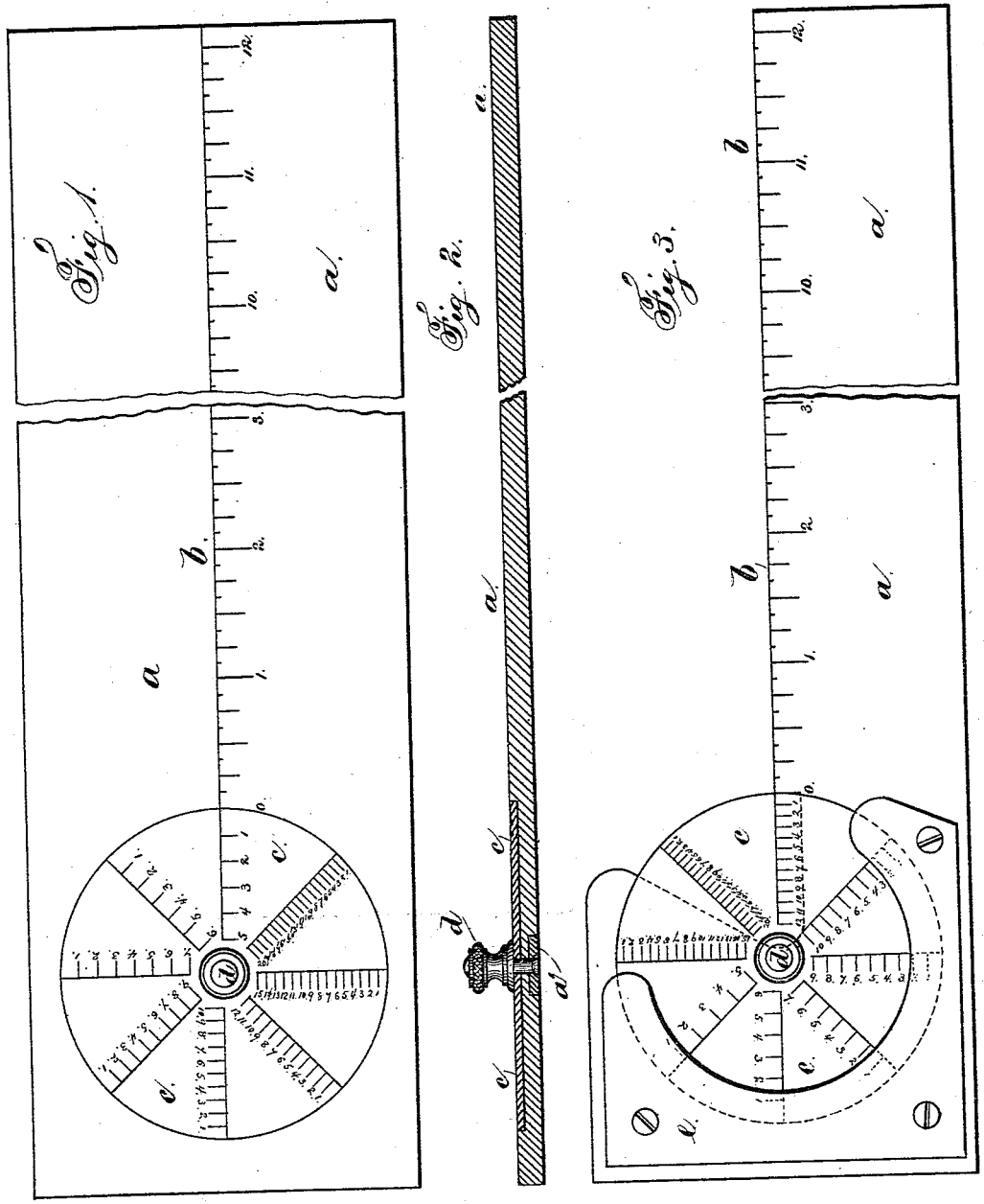
Witnesses
Harold Serrell
Chas. H. Smith
Inventor
per John T. Honeycutt
Lemuel W. Serrell atty

UNITED STATES PATENT OFFICE.

JOHN T. HONEYCUTT, OF NEW BRUNSWICK, NEW JERSEY.

LINEAR SCALE.

SPECIFICATION forming part of Letters Patent No. 346,368, dated July 27, 1886.

Application filed April 10, 1886. Serial No. 198,434. (No model.)

*To all whom it may concern:*

Be it known that I, JOHN T. HONEYCUTT, of New Brunswick, in the county of Middlesex and State of New Jersey, have invented a new and useful Improvement in Linear Scales; and the following is declared to be a description of the same.

Linear scales as heretofore made of wood, ivory, or metal have been in the form of a flat strip or ruler or a prismatic bar, and upon the surface of the same different scales have been marked.

The object of my invention is to provide a linear scale upon whose surface there shall be different fractional scales, combined with a regular measuring-scale divided into inches or similar parts.

My improved linear scale is made of a strip or blade of wood, ivory, or metal, upon the face of which a scale of suitable length is laid out, and at one end of said scale I provide a circular disk of metal, glass, horn, or similar material, which disk is adapted to be revolved, and the surface is divided equally by radial lines, upon which different fractional scales are laid out, the numbering of said scales commencing at the periphery of the disk and going toward the center. The pivot of the disk is in line with the main scale of the measuring-instrument, so that any one of the radial fractional-scale lines upon the disk can be made to coincide with and be a continuation of the line of the main scale.

In the drawings, Figure 1 is a plan of my improved scale. Fig. 2 is a longitudinal section of the same, and Fig. 3 is a plan of a modification of said scale.

The blade *a* may be of wood, ivory, metal, or other desired material, and upon a line drawn lengthwise of the blade, and preferably through the center thereof, is laid out a scale or measure of any desired length at *b*. I have shown in the drawings a scale of inches.

At *c*, upon the left-hand end of the blade *a*, I have shown a circular disk that is received into a recess in the blade *a*, so that the surface of disk *c* and blade *a* are flush with each other, and I provide a finger-piece or button, *d*, secured to the disk, and passing through the blade *a* and a washer, *a'*, in which washer the end of the stem of said button is headed. By means of this button *d* the disk *c* can be revolved, and the center of said disk is on line with the line of the scale *b*.

Upon the surface of the disk *c* there are radial lines forming regular divisions in the disk. I have shown eight such radial lines, each of an inch in length, and upon said radial lines different fractional scales are laid out. I have shown five, six, seven, nine, ten, twelve, fifteen, and twenty divisions to the inch, and said disk *c* can be revolved to bring any desired radial line, with its divisions, to coincide with and be a continuation of the line of the main scale. These fractional divisions are numerically placed upon the disk-lines, commencing from the periphery and extending toward the center.

The disk *c* may be made of metal, ivory, glass, horn, or other suitable substance.

In the scale shown in Fig. 3 a portion of the blade *a* is cut away, so that the scale-line forms the edge of the blade, and the disk *c* in this case I prefer to make of horn, glass, or other transparent material, with the button *d* connected to it, and said disk is to be held in its recess in the blade *a* by a segmental metal plate, *e*, which covers more than half of its edge. The fractional divisions on this transparent disk may be made on the under side, if desired.

With the scale shown in Fig. 1 it is necessary to use compasses or dividers in drafting operations; but the scale shown in Fig. 3 is capable of direct application to the drawing-paper without the necessary use of compasses.

I claim as my invention—

1. The circular movable disk *c*, having radial lines, and fractional divisions upon the respective lines, in combination with the blade *a*, and a pivot-pin for connecting the blade and disk together, said blade having a scale, *b*, adjacent to the edge of the disk and in line with the center thereof, substantially as specified.

2. A linear scale having a blade, *a*, with a scale, *b*, upon its surface, in combination with the circular disk *c*, having equidistant radial lines, and fractional divisions along said lines, numbered from the periphery of the disk *c*, and a finger-piece or button, *d*, for revolving said disk, substantially as and for the purposes set forth.

Signed by me this 3d day of April, A. D. 1886.

J. T. HONEYCUTT.

Witnesses:
HAROLD SERRELL,
GEO. T. PINCKNEY.